(12) United States Patent
Lee

(10) Patent No.: US 7,443,773 B2
(45) Date of Patent: Oct. 28, 2008

(54) INFORMATION STORAGE MEDIUM AND METHOD AND APPARATUS FOR RECORDING/REPRODUCING DATA

(75) Inventor: Kyung-geun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 727 days.

(21) Appl. No.: 10/875,500

(22) Filed: Jun. 25, 2004

(65) Prior Publication Data

US 2005/0002296 A1 Jan. 6, 2005

(30) Foreign Application Priority Data

Jun. 28, 2003 (KR) .................. 10-2003-0042998

(51) Int. Cl.
*G11B 5/09* (2006.01)
*G11B 7/24* (2006.01)

(52) U.S. Cl. .............. 369/47.21; 369/275.4; 369/53.21; 369/59.23

(58) Field of Classification Search ... 369/275.1–275.5, 369/47.27, 44.13, 44.26, 47.21, 53.21, 59.23
See application file for complete search history.

(56) References Cited

U.S. PATENT DOCUMENTS

| | | | |
|---|---|---|---|
| 6,208,614 B1 * | 3/2001 | Kim | 369/275.4 |
| 6,339,571 B1 * | 1/2002 | Torazawa et al. | 369/53.2 |
| 7,123,559 B2 * | 10/2006 | Lee et al. | 369/47.27 |
| 7,146,624 B2 * | 12/2006 | Yoon et al. | 720/718 |
| 7,218,601 B2 * | 5/2007 | Lee et al. | 369/275.3 |
| 2003/0002420 A1 | 1/2003 | Yoon et al. | |

FOREIGN PATENT DOCUMENTS

| | | |
|---|---|---|
| JP | 10-222874 | 8/1998 |
| JP | 10-320784 | 12/1998 |
| KR | 2004-0067406 | 7/2004 |

* cited by examiner

*Primary Examiner*—Ali Neyzari
(74) *Attorney, Agent, or Firm*—Stein, McEwen & Bui, LLP

(57) ABSTRACT

An information storage medium having a lead-in area, a user data area, and a lead-out area, wherein information regarding whether additional information is recorded as wobbling pits is recorded in at least a portion of at least one of the lead-in and the lead-out areas.

22 Claims, 4 Drawing Sheets

INFORMATION STORAGE MEDIUM AND METHOD AND APPARATUS FOR RECORDING/REPRODUCING DATA

CROSS-REFERENCE TO RELATED APPLICATIONS

This application claims the priority of Korean Patent Application No. 2003-42998, filed on Jun. 28, 2003, in the Korean Intellectual Property Office, the disclosure of which is incorporated herein by reference.

BACKGROUND OF THE INVENTION

1. Field of the Invention

The present invention relates to an information storage medium and method and apparatus for recording/reproducing data, and, more particularly, to an information storage medium on which information regarding whether additional information has been written to either or both of lead-in and lead-out areas in the form of wobbling pits is recorded, and an apparatus and method for recording/reproducing data on/from the information storage medium.

2. Description of the Related Art

In general, an optical information storage medium such as an optical disk has become widely adopted as a data recording medium of an optical pickup system for non-contact recording/playback. For example, compact disks (CDs) and digital versatile disks (DVDs) are two types of optical disks that are classified depending on data recording capacity. Examples of optical disks facilitating writing, erasing, and reading of information include 650 MB CD-Recordable (CD-R), CD-Rewritable (CD-RW), 4.7 GB DVD+RW, DVD-Random Access Memory (RAM), and DVD-R/RW. Examples of read-only disks include 650 MB CD-ROM and 4.7 GB DVD-ROM. In addition, a High Definition-DVD (HD-DVD) with a recording capacity of over 20 GB is currently being developed.

Various types of the information storage media described above have standardized specifications so as to be compatible with other types of media, and thus increase user convenience and reduce costs. For storage media not yet defined by a specification, efforts toward standardization are being made. In particular, development of a new format providing reverse compatibility and consistency with existing storage media is needed.

In conventional storage media, data is recorded in the form of pits or groove wobbles. Here, the pits are hollow portions physically impressed in the surface of a substrate during the manufacture of a disk, and the groove wobbles are formed in a wave pattern called a wobble that is used to record data. While a pit signal is detected as the sum signal, a groove wobble signal is detected as a push-pull signal. Since a signal channel varies depending on whether data is recorded in the form of pits or groove wobbles, it is highly desirable to separately record information in the form in which data is recorded.

SUMMARY OF THE INVENTION

The present invention provides an information storage medium on which information regarding whether additional information is recorded as wobbling pits is recorded, and an apparatus to record/reproduce, and a method of recording/reproducing, data to/from the information storage medium.

Additional aspects and/or advantages of the invention will be set forth in part in the description which follows and, in part, will be obvious from the description, or may be learned by practice of the invention.

According to an aspect of the present invention, there is provided an information storage medium having a lead-in area, a user data area, and a lead-out area, wherein information regarding whether additional information is recorded as wobbling pits is recorded on at least a portion of at least one of the lead-in and the lead-out areas.

The information regarding whether additional information is recorded as wobbling pits may be written to a region of the at least one of the lead-in and the lead-out areas in which disk-related information is recorded.

The information recorded as the wobbling pits may be modulated in a different way than the information not recorded as wobbling pits.

The additional information recorded as the wobbling pits may comprise at least one of identification (ID) of a type of the information storage medium, a serial number, a type of content recorded, a manufacturer of the medium, and copy protection data.

According to another aspect of the present invention, there is provided an information storage medium having a lead-in area, a user data area, and a lead-out area, wherein information regarding whether additional information is recorded other than in pits is recorded on at least a portion of at least one of the lead-in and the lead-out areas.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
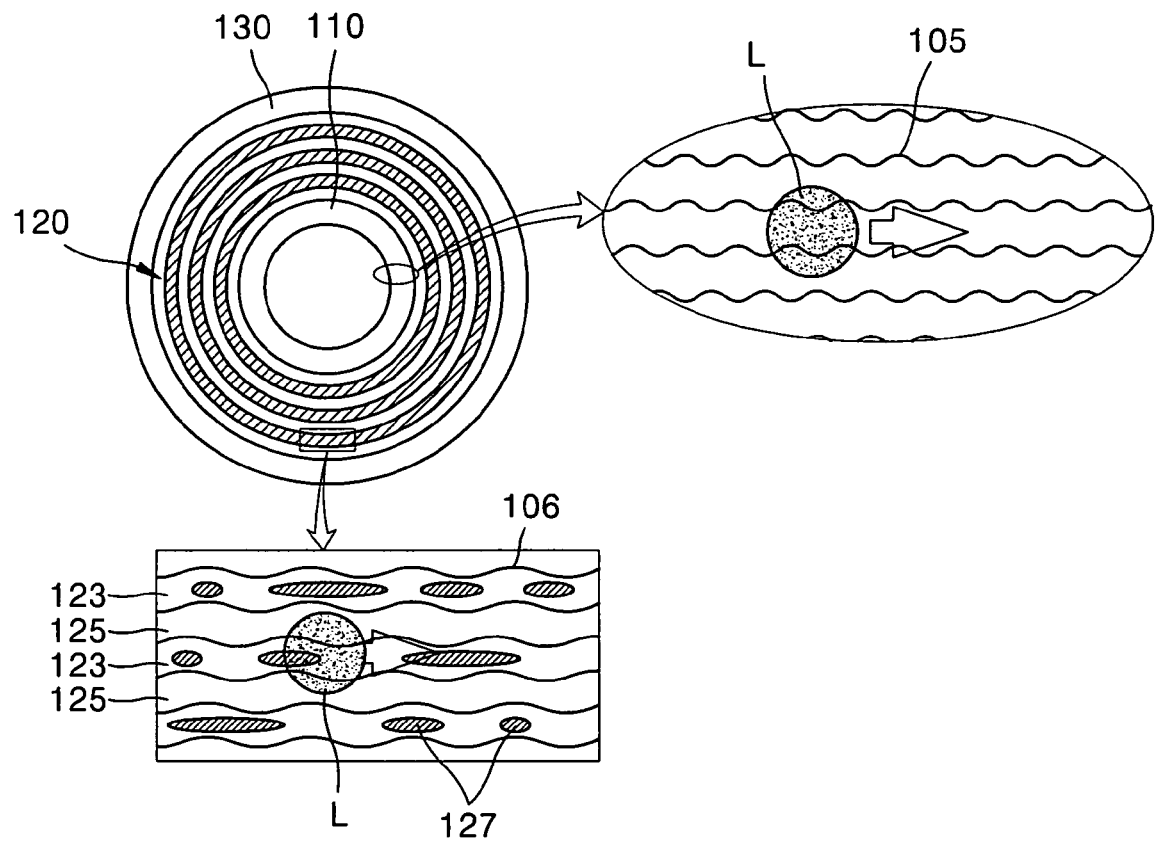
FIG. 1 is a schematic diagram showing the physical layout of a conventional recordable high-density information storage medium.

Reference will now be made in detail to the embodiments of the present invention, examples of which are illustrated in the accompanying drawings, wherein like reference numerals refer to the like elements throughout. The embodiments are described below to explain the present invention by referring to the figures.

Referring to FIG. 1, a conventional recordable information storage medium includes a lead-in area 110, a user data area 120, and a lead-out area 130. The storage medium includes grooves 123 and lands 125. Here, user data may be written only in the grooves 123, or both in the grooves 123 and on the lands 125.

Meanwhile, when read-only data is recorded in the lead-in area 110, wave-like high frequency and low frequency wobble signals 105 and 106 having fixed frequencies are continuously recorded on the sidewalls of the lands 125 and/or the grooves 123 instead of pits. Here, to write or read data, a beam L follows the grooves 123 and/or lands 125 (tracks).

In particular, the lead-in area 110 or the lead-out area 130 has a read-only region containing disk-related information and a recordable region. While the disk-related information is recorded in the high frequency wobbles 105, the recordable region of the lead-in or lead-out area 110 or 130 and the user data area 120 have the low frequency wobbles 106. Reference numeral 127 represents a recording mark formed on the user data area 120.

The read-only data recorded in the lead-in or lead-out area 110 or 130 can be reproduced using a push-pull channel, and user data recorded in the user data area 120 can be reproduced using a sum channel.

The data recorded in the lead-in or lead-out area 110 or 130 is modulated using a bi-phase modulation method, whereas the user data is modulated using a run length limit (RLL) modulation method, which will be described later. In the bi-phase modulation, the state of each bit is determined according to whether a signal state changes within a given period. For example, a 0 bit is represented by no change in the phase of a groove wobble while a 1 bit is represented by a change in phase. Since 1 or 0 is represented depending on whether the state or phase of a signal changes between two possible states or phases within a given period, this is called "bi-phase modulation". While the phase modulation of groove wobbles has been described above, it is possible to modulate the phase of various other patterns.

Figure 2:
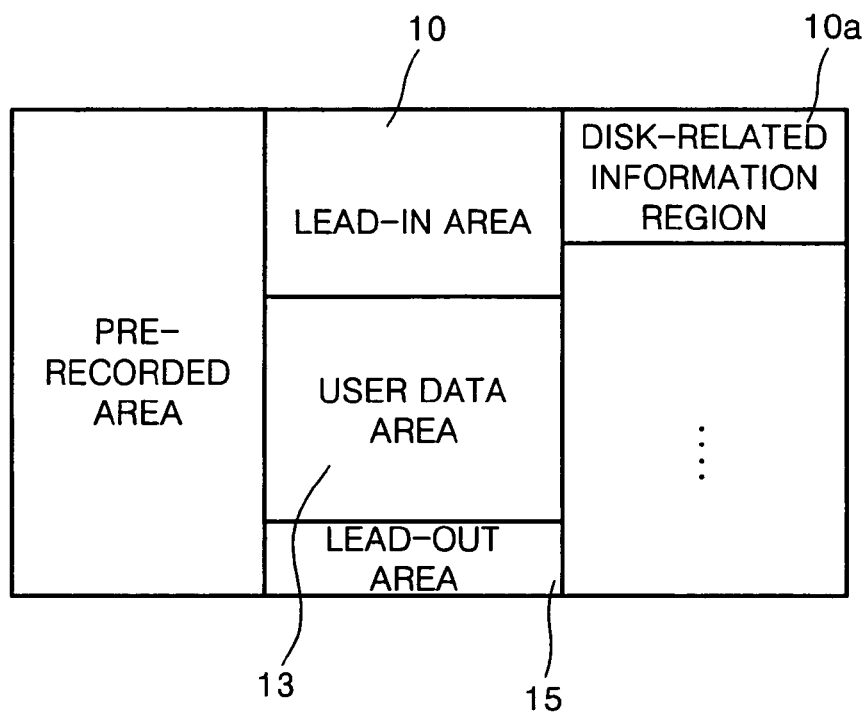
FIG. 2 is a schematic diagram showing the layout structure of an information storage medium according to an embodiment of the present invention.

To achieve consistency in a modulation technique with the recordable optical information storage medium, the layout structure of a read-only information storage medium according to an embodiment of the present invention may be as shown in FIG. 2.

Referring to FIG. 2, the read-only information storage medium includes a user data area 13 in which user data is recorded, a lead-in area 10 located in an inner area relative to the user data area 13, and a lead-out area 15 located in an outer area relative to the user data area 13. Data is recorded in the form of pits in the lead-in area 10, the user data area 13, and the lead-out area 15.

Figure 3A:
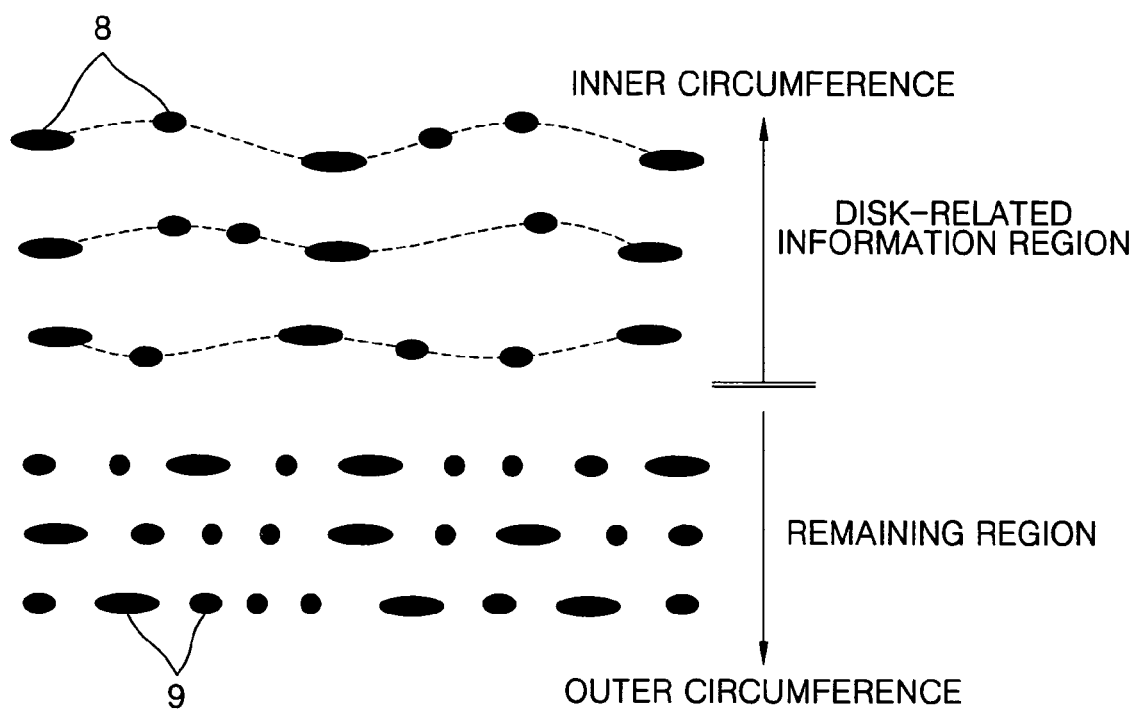
FIGS. 3A and 3B show wobbling pits and non-wobbling pits formed in the information storage medium of FIG. 2 according to two embodiments of the present invention.
Figure 3B:
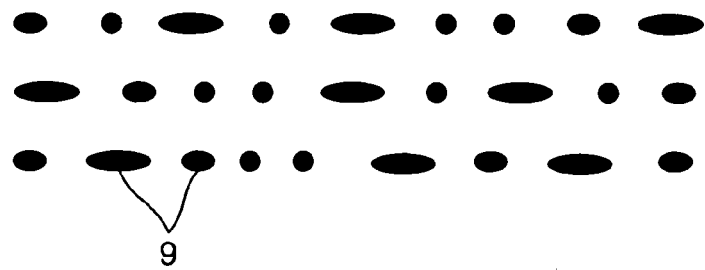

In particular, as shown in FIG. 3A, data is recorded in wobbling pits 8 in a portion or all of one or both of the lead-in and lead-out areas 10 and 15. In an area excluding the portion or area formed with the wobbling pits, data can be recorded as non-wobbling pits 9. Alternatively, as shown in FIG. 3B, data may be recorded as the non-wobbling pits 9 on a portion or all of the lead-in area 10. The wobbling pits 8 are a sequence of pits arranged in a wave pattern, while the non-wobbling pits 9 are arranged in a line pattern.

The wobbling pits 8 contain data recorded as pits and additional information recorded in wobbles. Here, the additional information appended to the data recorded in the form of pits may contain at least one of identification (ID) of the type of an information storage medium, a serial number, the type of content recorded, a manufacturer of the medium, and data (or a special algorithm) used to prevent copying to another storage medium. In contrast, the non-wobbling pits 9 contain only data recorded as pits, with no additional appended information.

The information storage medium according to this embodiment of the present invention also contains information regarding whether the additional information is written to a portion or all of one or both of the lead-in and lead-out areas 10 and 15. In other words, information regarding whether or not a pit sequence is wobbled is separately recorded on the medium.

The information regarding the recording of the additional information may be recorded in the lead-in area 10, and preferably, though not necessarily, in a disk-related information region 10a. For example, the information about the recording of the additional information may be recorded in predetermined bytes on the disk-related information region 10a as follows:

0000 0000b: additional information not recorded (non-wobbling)

0000 0001b: additional information recorded (wobbling)

Separately recording the information about the recording of additional information in this way allows fast, reliable reproduction of the additional information.

Meanwhile, the reliability of recording and reproduction of the additional information can be enhanced by modulating and demodulating data recorded in the form of wobbling pits in a different way from the modulation and demodulation of user data. For example, data recorded in the entire lead-in area 10 or the disk-related information region 10a may be bi-phase modulated, while data in the remaining area may be modulated using RLL. RLL is a modulation technique that limits the number of consecutive 0's between the successive 1's. RLL(d,k) indicates that the sequence of 0's ranges from d to k. For example, bi-phase modulation may be used to record data in the disk-related information region 10a, while RLL (1,7) may be used to record in the remaining region.

The information storage medium according to this embodiment of the present invention may have single or multiple information storage layers. As described above, the information storage medium according to this embodiment of the present invention enables fast reproduction of additional information by recording information regarding whether the additional information is recorded in one or both of the lead-in and lead-out areas.

Figure 4:
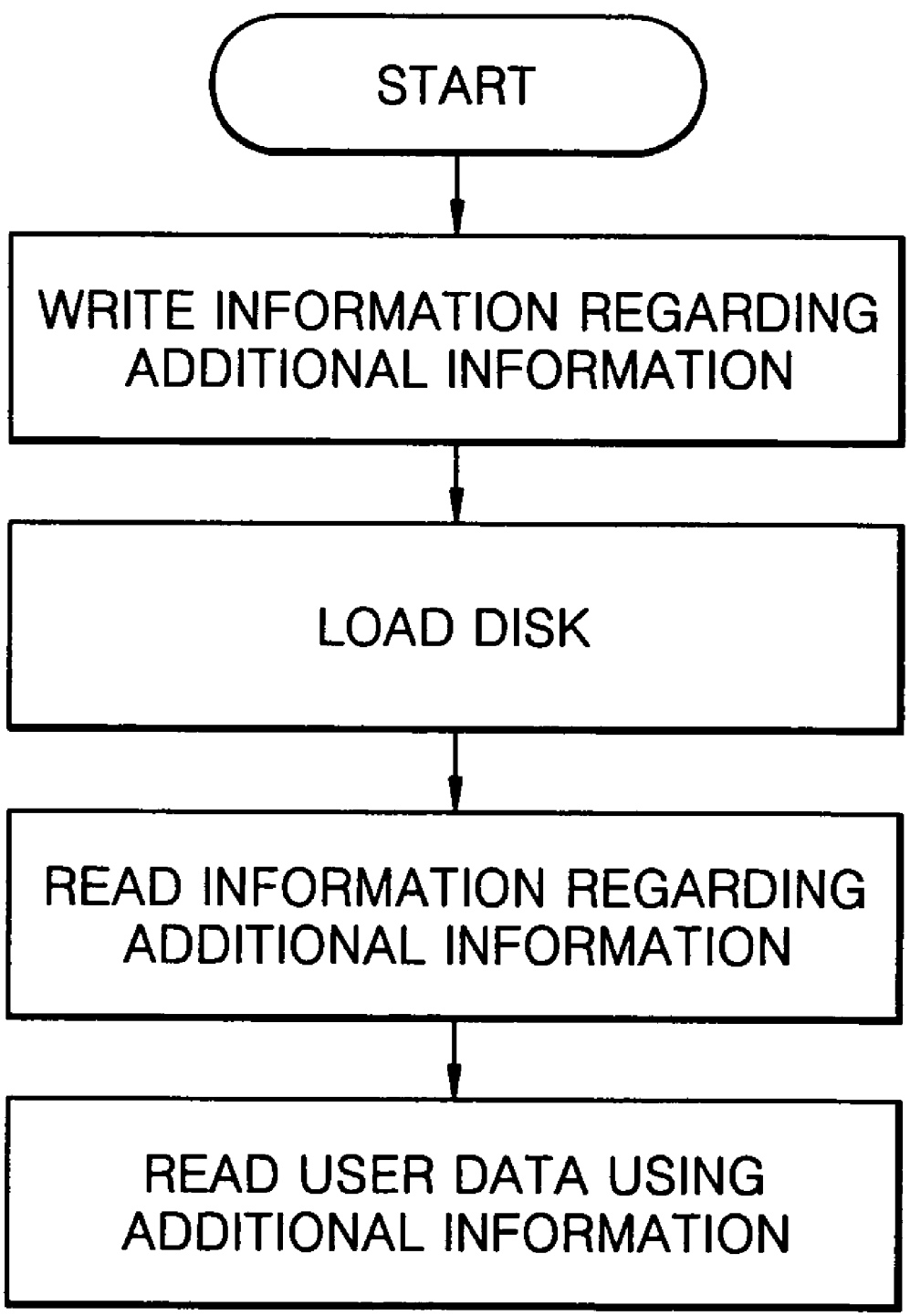
FIG. 4 is a flowchart illustrating a method of recording and/or reproducing data according to an embodiment of the present invention.

FIG. 4 is a flowchart illustrating a method of recording and/or reproducing data according to an embodiment of the present invention. According to this method, information regarding whether additional information is recorded in an information storage medium is written to a predetermined region of the information storage medium, for example, a disk-related information region. The additional information is recorded in the form of wobbles containing wobbling pits. Once the information storage medium has been loaded, the information on the recording of the additional information is read. If the information indicates that the additional information is recorded, the additional information is read and then used to read user data from the information storage medium.

Figure 5:
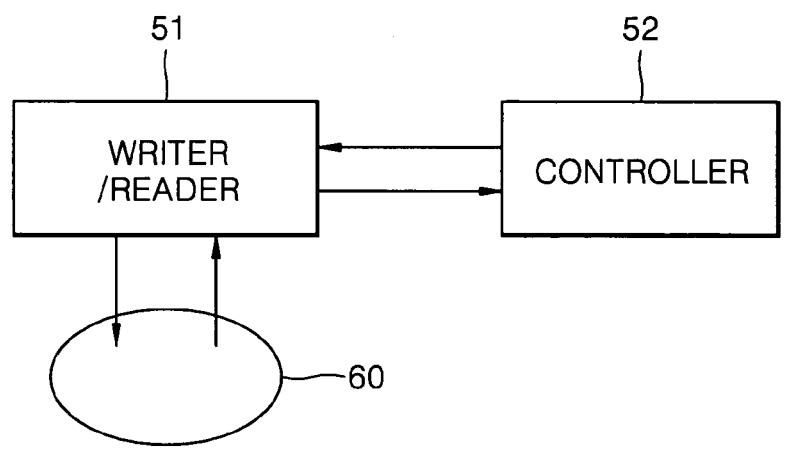
FIG. 5 is a block diagram of an apparatus to record and/or reproduce information about recording of additional information according to an embodiment of the present invention.

FIG. 5 is a block diagram of an apparatus to record and/or reproduce information regarding recording of additional information according to an embodiment of the present invention. The apparatus includes a writer/reader 51 and a controller 52. The writer/reader 51 records data on an information storage medium 60 according to this embodiment of the present invention and reads the recorded data therefrom. The controller 52 controls the writer/reader 51 so as to record the information about recording of the additional information on the information storage medium 60, and read the additional information according to the recorded information about recording of the additional information.

Figure 6:
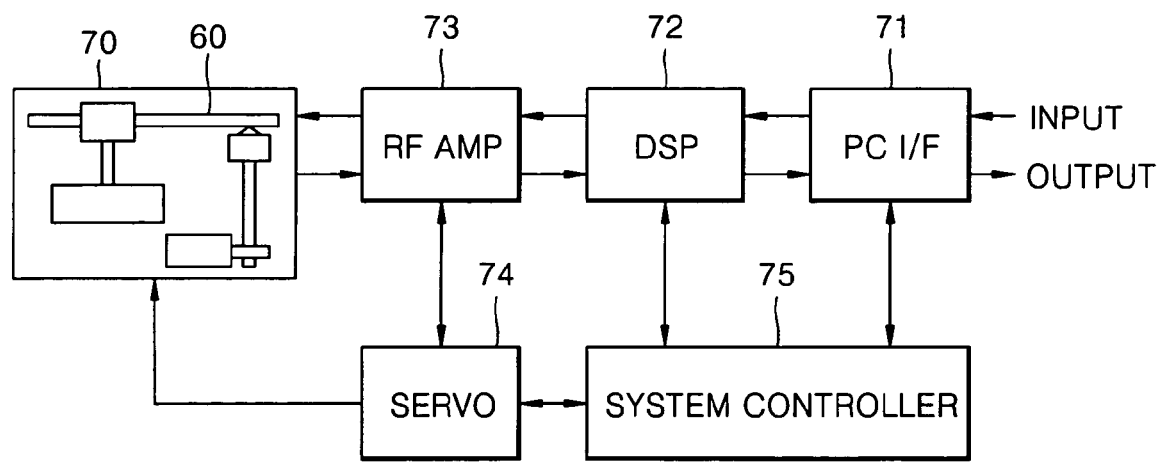
FIG. 6 is a block diagram showing an exemplary configuration of the data recording/reproducing apparatus of FIG. 5.

FIG. 6 is a block diagram showing an exemplary configuration of the data recording/reproducing apparatus of FIG. 5. Referring to FIG. 6, the writer/reader 51 includes a pickup 70 on which the information storage medium 60 is mounted. The controller 52 comprises a PC interface (I/F) 71, a digital signal processor (DSP) 72, an RF amplifier (AMP) 73, a servo 74, and a system controller 75.

During recording, the PC I/F 71 receives a recording command together with data to be recorded from a host (not shown). The system controller 75 performs initialization required for recording by reading information needed for the initialization, such as disk information stored in a lead-in area, and then preparing for recording based on the read information. The DSP 72 encodes data to be recorded, which is received from the host, using error correction code (ECC) by introducing additional data such as parity bits for error correction, and then modulates the ECC-encoded data using a predetermined modulation technique. The RF AMP 73 converts the data received from the DSP 72 into an RF signal. The pickup 70 records the RF signal received from the RF AMP 73 on the information storage medium 60. The servo 74 receives a command needed for servo control from the system controller 75 and performs servo control of the pickup 70. The system controller 75 allows the pickup 70 to record information regarding recording of the additional information in a predetermined region of the information storage medium 60.

During reproduction of the information stored on the information storage medium 60, the PC I/F 71 receives a reproduce command from a host (not shown). The system controller 75 performs an initialization process needed for data reproduction. Specifically, the system controller 75 reads information about the recording of additional information on the information storage medium 60 according to this embodiment of the present invention, and reads the additional information accordingly. The pickup 70 outputs an optical signal obtained by emitting a laser beam onto the information storage medium 60 and receiving the laser beam reflected from the information storage medium. The RF AMP 73 converts the optical signal output from the pickup 70 into an RF signal, sends modulated data obtained from the RF signal to the DSP 72, and provides a servo signal for control obtained from the RF signal to the servo 74. The DSP 72 demodulates the modulated data and outputs the data subjected to error correction using an ECC algorithm. The servo 74 receives the servo signal from the RF AMP 73 and the command needed for servo control from the system controller 75 and performs servo control of the pickup 70. The PC/IF 71 transmits the data received from the DSP 72 to the host.

As described above, the data recording/reproducing apparatus enables information about recording of additional information to be recorded on an information storage medium and the additional information to be quickly and precisely reproduced therefrom using the recorded information.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An information storage medium comprising:
   a lead-in area having data recorded as wobbling pits and data recorded as non-wobbling pits;
   a user data area; and
   a lead-out area having data recorded as wobbling pits and data recorded as non-wobbling pits;
   wherein information regarding whether additional information is recorded as wobbling pits is recorded as non-wobbling pits on at least a portion of at least one of the lead-in and the lead-out areas.

2. The information storage medium of claim 1, wherein the information regarding whether additional information is recorded as wobbling pits is written to a region of the at least one of the lead-in and the lead-out areas in which disk-related information is recorded.

3. The information storage medium of claim 1, wherein the information recorded as wobbling pits is modulated in a different way than the information not recorded as wobbling pits.

4. The information storage medium of claim 1, wherein the additional information recorded as the wobbling pits comprises at least one of identification (ID) of a type of the information storage medium, a serial number, a type of content recorded, a manufacturer of the medium, and copy protection data.

5. The information storage medium of claim 1, wherein the information storage medium is an optical disk.

6. An information storage medium comprising:
   a lead-in area having data recorded as wobbling pits and data recorded as non-wobbling pits;
   a user data area; and
   a lead-out area having data recorded as wobbling pits and data recorded as non-wobbling pits;
   wherein information regarding whether additional information is recorded other than in pits is recorded as non-wobbling pits on at least a portion of at least one of the lead-in and the lead-out areas.

7. The information storage medium of claim 6, wherein the additional information is recorded as wobbles of wobbling pits.

8. The information storage medium of claim 6, wherein the additional information comprises at least one of identification (ID) of a type of the information storage medium, a serial number, a type of content recorded, a manufacturer of the medium, and copy protection data.

9. A method of recording/reproducing data on/from an information storage medium having a lead-in area, a user data area, and a lead-out area, the method comprising:
   recording information as non-wobbling pits on at least a portion of at least one of the lead-in and the lead-out areas, the information regarding whether additional information is recorded as wobbling pits;
   reading the information regarding the additional information in response to the information storage medium being loaded; and
   reading the additional information according to the read information.

10. The method of claim 9, wherein the additional information recorded as the wobbling pits is modulated in a different way than the information not recorded as wobbling pits.

11. The medium of claim 9, wherein the additional information recorded as the wobbling pits comprises at least one of identification (ID) of a type of the information storage medium, a serial number, a type of content recorded, a manufacturer of the medium, and copy protection data.

12. A method of recording/reproducing data on/from an information storage medium having a lead-in area, a user data area, and a lead-out area, the method comprising:

recording information as non-wobbling pits on at least a portion of at least one of the lead-in and the lead-out areas, the information regarding whether additional information is recorded other than as pits; and reproducing the additional information according to the recorded information regarding the additional information.

13. The method of claim 12, wherein the information recorded as pits is modulated in a different way than the additional information not recorded as pits.

14. The method of claim 12, wherein the additional information comprises at least one of identification (ID) of a type of the information storage medium, a serial number, a type of content recorded, a manufacturer of the medium, and copy protection data.

15. The method of claim 12, wherein the additional information is recorded as wobbles of wobbling pits.

16. An apparatus to record/reproduce data on/from an information storage medium, the apparatus comprising:

a reading unit to read information recorded as non-wobbling pits, the information regarding whether additional information is recorded as wobbling pits on the information storage medium; and a controller to control the reading unit to reproduce the additional information according to the information read by the reading unit.

17. The apparatus of claim 16, wherein the additional information recorded as wobbling pits is modulated in a different way than the information not recorded as wobbling pits.

18. The apparatus of claim 16, wherein the additional information recorded as wobbling pits comprises at least one of identification (ID) of a type of the information storage medium, a serial number, a type of content recorded, a manufacturer of the medium, and copy protection data.

19. An information storage medium wherein information regarding whether a pit sequence is wobbled is recorded as non-wobbling pits separately from the wobbled pit sequence on the information storage medium.

20. The information storage medium of claim 19, wherein the information is recorded in a lead-in area of the information storage medium.

21. The information storage medium of claim 20, wherein the information is recorded in a disk-related information region of the lead-in area.

22. A method of recording/reproducing data on/from an information storage medium, comprising:

recording/reproducing disk-related data as/from non-wobbling pits, wherein the disk-related data is information regarding whether additional information is recorded as wobbling pits on the information storage medium; and modulating and demodulating the disk-related data in a different way than user data recorded on the information storage medium.

* * * * *